US012792913B2

(12) United States Patent
Lampinen

(10) Patent No.: US 12,792,913 B2
(45) Date of Patent: Nov. 10, 2026

(54) NEURAL NETWORKS WITH HIERARCHICAL ATTENTION MEMORY

(71) Applicant: GDM Holding LLC, Mountain View, CA (US)

(72) Inventor: Andrew Kyle Lampinen, Palo Alto, CA (US)

(73) Assignee: GDM Holding LLC, Mountain View, CA (US)

( * ) Notice: Subject to any disclaimer, the term of this patent is extended or adjusted under 35 U.S.C. 154(b) by 411 days.

(21) Appl. No.: 18/564,959

(22) PCT Filed: May 27, 2022

(86) PCT No.: PCT/EP2022/064497

§ 371 (c)(1),
(2) Date: Nov. 28, 2023

(87) PCT Pub. No.: WO2022/248723

PCT Pub. Date: Dec. 1, 2022

(65) Prior Publication Data

US 2024/0386264 A1 Nov. 21, 2024

Related U.S. Application Data

(60) Provisional application No. 63/194,894, filed on May 28, 2021.

(51) Int. Cl.
*G06F 12/00* (2006.01)
*G06N 3/08* (2023.01)

(52) U.S. Cl.
CPC .................................... *G06N 3/08* (2013.01)

(58) Field of Classification Search
CPC .......... G06N 3/08; G06N 3/006; G06N 3/045; G06N 3/0455; G06N 3/0895; G06N 3/09;
(Continued)

(56) References Cited

U.S. PATENT DOCUMENTS

2021/0049474 A1* 2/2021 Son ........................ G06N 3/045

OTHER PUBLICATIONS

Parisotto, Emilion et al., Stabilizing Transformers for Reinforcement Learning, 2020, Proceedings of the 37th International Conference on Machine Learning, Retrieved from the Internet: URL: http://proceedings.mlr.press/v119/parisotto20a/parisotto20a.pdf (Year: 2020).*

(Continued)

*Primary Examiner* — Shawn X Gu
(74) *Attorney, Agent, or Firm* — Fish & Richardson P.C.

(57) ABSTRACT

Methods, systems, and apparatus, including computer programs encoded on computer storage media, for performing a machine learning task on a network input to generate a network output. One of the systems includes an attention neural network comprising one or more hierarchical attention blocks, each hierarchical attention block configured to: receive an input sequence for the hierarchical attention block; maintain a plurality of memory summary keys, each memory summary key corresponding to a respective one of a plurality of partitions of a sequence of memory block inputs; determine a proper subset of the plurality of memory summary keys; and generate an attended input sequence for the hierarchical attention block including applying an attention mechanism over the respective memory block inputs at the memory positions within the partitions of the sequence of memory block inputs that correspond to the proper subset of the plurality of memory summary keys.

20 Claims, 6 Drawing Sheets

(58) Field of Classification Search
CPC ...... G06N 3/092; G06N 3/0985; G06N 3/084; G06N 3/06; H04Q 2213/343; H04L 25/0254; G05B 2219/25255; G05B 2219/32335; G05B 2219/41054; G05B 2219/39271; G06F 17/16
See application file for complete search history.

(56) References Cited

OTHER PUBLICATIONS

Baillargeon, "Infants' reasoning about hidden objects: evidence for event-general and event-specific expectations," Developmental Science, Aug. 16, 2004, 7(4):391-414.
Banino et al., "Memo: A deep network for flexible combination of episodic memories," International Conference on Learning Representations, 2020, 25 pages.
Brown et al., "Language models are few-shot learners," CoRR, May 28, 2020, arXiv:2005.14165, 75 pages.
Caccia et al., "Online fast adap-tation and knowledge accumulation: a new approach to continual learning," CoRR, Mar. 12, 2020, arXiv:2003.05856, 26 pages.
Chan et al., "Lingering representations of stimuli influence recall organization," Neuropsychologia, Mar. 2017, 97:72-82.
Chang et al., "Relating the Past with the Present: Information Integration and Segregation during Ongoing Narrative Processing," Journal of Cognitive Neuroscience, May 1, 2021, 33(6):1106-1128.
Cordonnier et al., "Differentiable patch selection for image recognition," CoRR, Apr. 7, 2021, arXiv:2104.03059, 15 pages.
Dai et al., "Transformer-xi: Attentive language models beyond a fixed-length context," CoRR, Jan. 9, 2019, arXiv:1901.02860, 20 pages.
Dehghani et al., "Universal transformers," CoRR, Jul. 10, 2018, arXiv:1807.03819, 23 pages.
Devlin et al., "Bert: Pre-training of deep bidirectional transformers for language understanding," CoRR, Oct. 11, 2018, arxiv.org/abs/1810.04805, 16 pages.
Espeholt et al., "IMPALA: Scalable Distributed Deep-RL with Importance Weighted Actor-Learner Architectures," Proceedings of the 35th International Conference on Machine Learning, 2018, 80:1407-1416.
Fedus et al., "Switch transformers: Scaling to trillion parameter models with simple and efficient sparsity," CoRR, Jan. 11, 2021, arXiv:2101.03961, 40 pages.
Finn et al., "Online meta-learning. In International Conference on Machine Learning," Proceedings of the 36th International Conference on Machine Learning, 2019, 97:1920-1930.
Fortunato et al., "Generalization of rein-forcement learners with working and episodic memory," CoRR, Oct. 29, 2019, arXiv:1910.13406, 31 pages.
Graves et al., "Hybrid computing using a neural network with dynamic external memory," Nature, Oct. 12, 2016, 538:(7626):471-476.
Hasson et al., "Hierarchical process memory: memory as an integral component of information processing," Trends in Cognitive Sciences, May 13, 2015, 19(6):304-313.
He et al., "Task agnostic continual learning via meta learning," CoRR, Jun. 12, 2019, arXiv:1906,05201, 13 pages.
Hill et al., "Environmental drivers of systematicity and generalization in a situated agent," International Conference on Learning Representations, Dec. 19, 2019, 15 pages.
Hill et al., "Grounded language learning fast and slow," International Conference on Learning Representations, Jan. 12, 2021, 17 pages.
Hung et al., "Optimizing agent behavior over long time scales by transporting value," Nature Communications, 10(1):1-12, 2019.
Hunter, "Matplotlib: A 2d graphics environment," Computing in Science & Engineering, May-Jun. 2007, 9(3):90-95.
International Preliminary Report on Patentability in International Appln. No. PCT/EP2022/064497, dated Dec. 7, 2023, 8 pages.
International Search Report and Written Opinion in International Appln. No. PCT/EP2022/064497, dated Sep. 28, 2022, 13 pages.
Jaegle et al., "Perceiver: General perception with iterative attention," CoRR, Mar. 4, 2021, arXiv:2103.03206, 43 pages.
Khandelwal et al., "Generalization through memorization: Nearest neighbor language models," International Conference on Learning Representations, Dec. 19, 2019, 13 pages.
Kingma "Adam: A method for stochastic optimization," CoRR, Dec. 22, 2014, arXiv:1412.6980, 15 pages.
Kitaev et al., "Reformer: The efficient transformer," CoRR, Jan. 13, 2020, arXiv:2001.04451, 12 pages.
Kocisk'y et al., "The narrativeQA reading comprehension challenge," Transactions of the Association for Computational Linguistics, May 1, 2018, 6:317-328.
Kumaran et al., "What learning systems do intelligent agents need? complementary learning systems theory updated," Trends in cognitive sciences, Jul. 2016, 20(7):512-534.
Lampinen et al., "Transforming task representations to perform novel tasks," Proceedings of the National Academy of Sciences, Dec. 10, 2020, 117(52):32970-32981.
Liu et al., "Hierarchical transformers for multi-document summarization," Proceedings of the 57th Annual Meeting of the Association for Computational Linguistics, Jul. 2019, pp. 5070-5081.
Lu et al., "Learning to use episodic memory for event prediction," bioRxiv, 2020, 45 pages.
Luong et al., "Effective approaches to attention based neural machine translation," CoRR, Aug. 17, 2015, arXiv:1508.04025, 11 pages.
McClelland et al., "Integration of new information in memory; new insights from a complementary learning systems perspective," Philosophical Transactions of the Royal Society B, Apr. 6, 2020, 375(1799):20190637.
McClelland et al., "Why there are complementary learning systems in the hippocampus and neocortex: insights from the successes and failures of connectionist models of learning and memory," Psychological Review, 1995, 102(3):419.
Mirowski et al., "The streetlearn environment and dataset," CoRR, Mar. 4, 2019, arXiv:1903.01292, 13 pages.
Moskvichev et al., "Updater-extractor architecture for inductive world state representations," CoRR, Apr. 12, 2021, arXiv:2104.05500, 15 pages.
Nematzadeh et al., "On memory in human and artificial language processing systems," Bridging AI and Cognitive Science Workshop at ICLR, 2020, 7 pages.
Ngo et al., "Contingency of semantic generalization on episodic specificity varies across development," Current Biology, Jun. 21, 2021, 31:2690-2697.
Parisotto et al., "Stabilizing transformers for reinforcement learning," Proceedings of the 37th International Conference on Machine Learning, Jul. 13, 2020, 12 pages.
Pham et al., "Out of order: How important is the sequential order of words in a sentence in natural language understanding tasks?," CoRR, Dec. 30, 2020, arXiv:2012.15180, 16 pages.
Rae et al., "Compressive transformers/or long-range sequence modelling," CoRR, Nov. 13, 2019, arxiv.org/abs/1911.05507, 19 pages.
Raffel et al., "Exploring the limits of transfer learning with a unified text-to-text transformer," Journal of Machine Learning Research, 2020, 21:1-67.
Ritter et al., "Rapid task-solving in novel environments," International Conference on Learning Representations, Jan. 12, 2021, 15 pages.
Santoro et al., "Meta-learning with memory-augmented neural networks," Proceedings of The 33rd International Conference on Machine Learning, 2016, 48:1842-1850.
Sols et al., "Event boundaries trigger rapid memory reinstatement of the prior events to promote their representation in long-term memory," Current Biology, Nov. 20, 2017, 27(22):3499-3504.
Suddendorf et al., "Mental time travel and the shaping of the human mind," Philosophical Transactions of the Royal Society B: Biological Sciences, May 12, 2009, 364(1521):1317-1324.
Sun et al., "Learning video representations using contrastive bidirectional transformer," CoRR, Jun. 13, 2019, arXiv:1906.05743, 12 pages.

(56) References Cited

OTHER PUBLICATIONS

Tay et al., "Long range arena: A benchmark for efficient transformers," International Conference on Learning Representations, 2021, 19 pages.
Tulving, "Memory and consciousness," Canadian Psychology/ Psychologie canadienne, 1985, 26 (1):1.
Vaswani, et al., "Attention Is All You Need," 31st Conference on Neural Information Processing Systems, 2017, 11 pages.
Wang et al., "Linformer: Self-attention with linear complexity," CoRR, Jun. 8, 2020, arXiv:2006.04768, 12 pages.
Wang, "Meta-learning in natural and artificial intelligence," Current Opinion in Behavioral Sciences, Apr. 2021, 38:90-95.
Waskom, "seaborn: statistical data visualization," Journal of Open Source Software, 2021, 6(60):3021.
Wayne et al., "Unsupervised predictive memory in a goal-directed agent," CoRR, Mar. 28, 2018, arXiv:1803.10760, 57 pages.
Xiao et al., "Selfsupervised learning: Generative or contrastive," IEEE Transactions on Knowledge and Data Engineering, Jan. 1, 2023, 35(1):857-876.
Yang et al., "Html: Hierarchical transformer-based multi-task learning for volatility prediction," Proceedings of The Web Conference, Apr. 2020, pp. 441-451.
Yogatama et al., "Adaptive semiparametric language models," CoRR, Feb. 4, 2021, arXiv:2102.02557, 11 pages.
Zacks et al., "Event segmentation," Current directions in psychological science, Apr. 2007, 16(2):80-84.
Zhang et al., "Hibert: Document level pre-training of hierarchical bidirectional transformers for document summarization," CoRR, May 16, 2019, arXiv:1905.06566, 11 pages.

* cited by examiner

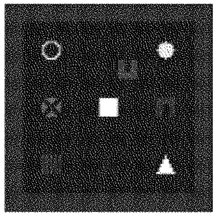

(a) Ballet.

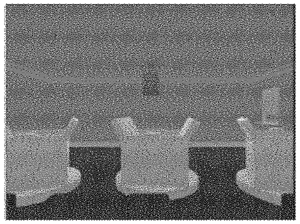

(b) Object permanence.

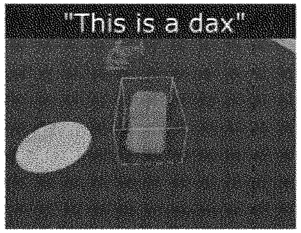

(c) Rapid word learning.

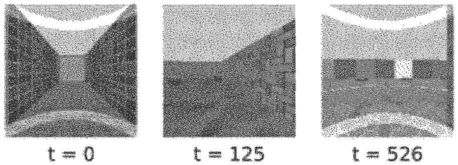

(d) Visual match.

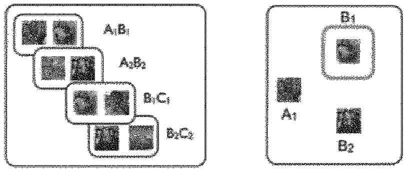

(e) Paired associative inference.

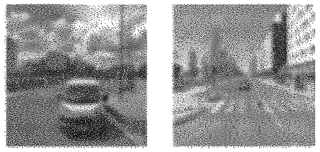

(f) One-shot StreetLearn navigation.

| Experiment | Level | HCAM | TrXL | LSTM |
| --- | --- | --- | --- | --- |
| Ballet | 2 dances, delay 16 | $99.8 \pm 0.3$ | $96.9 \pm 1.4$ | $97.4 \pm 1.8$ |
| | 8 dances, delay 16 | $98.1 \pm 3.3$ | $65.7 \pm 13.7$ | $25.2 \pm 2.7$ |
| | 8 dances, delay 48 | $97.2 \pm 2.5$ | $49.2 \pm 13.0$ | $29.7 \pm 9.4$ |
| Objects | No delay, varying train | $96.7 \pm 0.9$ | $82.2 \pm 28.7$ | $33.2 \pm 6.6$ |
| | Long delay, varying train | $91.7 \pm 8.3$ | $46.1 \pm 20.0$ | $34.8 \pm 5.5$ |
| | Long delay, long-only train | $82.9 \pm 16.4$ | $31.1 \pm 0.6$ | - |
| Words | 10 distractors | $93.0 \pm 4.0$ | $76.7 \pm 12.5$ | $21.0 \pm 18.3$ |
| | 4 episodes, 0 distractor each | $82.8 \pm 6.4$ | $49.3 \pm 16.5$ | $19.8 \pm 17.4$ |
| | 2 episodes, 5 distractors each | $71.1 \pm 8.0$ | $48.7 \pm 13.2$ | $22.9 \pm 20.1$ |
| Image | | $97.0 \pm 2.8$ | - | - |
| Associative | | $97.5 \pm 0.9$ | - | - |
| Streets | | $26.8 \pm 0.44$ | $19.9 \pm 0.65$ | - |

FIG. 5

NEURAL NETWORKS WITH HIERARCHICAL ATTENTION MEMORY

CROSS-REFERENCE TO RELATED APPLICATIONS

This application is a National Stage Application under 35 U.S.C. § 371 and claims the benefit of International Application No. PCT/EP2022/064497, filed May 27, 2022, which claims priority to U.S. Provisional Application No. 63/194,894, filed on May 28, 2021. The disclosure of the prior application is considered part of and is incorporated by reference in the disclosure of this application.

BACKGROUND

This specification relates to processing inputs using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network system implemented as computer programs on one or more computers in one or more locations that includes an attention neural network including one or more hierarchical attention blocks. The neural network system is configured to receive a network input and to perform a machine learning task on the network input to generate a network output for the machine learning task.

According to an aspect, there is provided a system for performing a machine learning task on a network input to generate a network output, the system comprising one or more computers and one or more storage devices storing instructions that, when executed by the one or more computers, cause the one or more computers to implement: an attention neural network configured to perform the machine learning task, the attention neural network comprising one or more hierarchical attention blocks, each hierarchical attention block configured to: receive an input sequence for the hierarchical attention block that has a respective block input at each of a plurality of input positions in an input sequence order; maintain a plurality of memory summary keys, each memory summary key corresponding to a respective one of a plurality of partitions of a sequence of memory block inputs that has a respective memory block input at each of a plurality of memory positions in a memory sequence order, wherein each memory block input has previously been processed by the hierarchical attention block when performing the machine learning task; determine, from the plurality of memory summary keys and a sequence of queries derived from the input sequence for the block, a proper subset of the plurality of memory summary keys; and generate an attended input sequence for the hierarchical attention block including applying an attention mechanism over the respective memory block inputs at the memory positions within the partitions of the sequence of memory block inputs that correspond to the proper subset of the plurality of memory summary keys.

The memory sequence order may correspond to a temporal order in which the memory block inputs were previously processed by the hierarchical attention block when performing the machine learning task.

The hierarchical attention block may be further configured to apply a normalization to the input sequence for the hierarchical attention block prior to determining the proper subset and generating the attended input sequence.

Determining the proper subset of the plurality of memory summary keys may comprise: determining a relevance score for each partition of the sequence of memory block inputs with respect to the sequence of queries, including, for each query in the sequence of queries, computing a dot product between the query and each of the plurality of memory summary keys; and selecting, based on the relevance scores, the proper subset of the plurality of memory summary keys from the plurality of memory summary keys that correspond to the respective partitions of the sequence of memory block inputs.

For each partition of the sequence of memory block inputs that corresponds to a respective memory summary key in the proper subset of the plurality of memory summary keys, the hierarchical attention block may be configured to: apply the attention mechanism between the input sequence and the respective memory block inputs at the memory positions within the partition to generate an initial attended input sequence.

Generating the attended input sequence for the hierarchical attention block may comprise: determining a weighted combination of the initial attended input sequences, wherein each initial attended input sequence may be weighted by the relevance score for the corresponding partition.

Generating the attended input sequence for the hierarchical attention block may further comprise: determining a combination between the input sequence and the attended input sequence.

Maintaining the plurality of memory summary keys may comprise: partitioning the memory block inputs into the plurality of partitions that are of a fixed length.

Maintaining the plurality of memory summary keys may comprise: applying a mean pooling operation over the one or more memory block inputs included in each partition to generate the memory summary key that corresponds to the partition.

The hierarchical attention block may be further configured to: apply a feed-forward transformation to the attended input sequence to generate an output sequence for the hierarchical attention block.

The input sequence for the hierarchical attention block may comprise a sequence of attention layer outputs of an attention layer of the attention neural network that is configured to generate the sequence of attention layer outputs based on applying a self-attention mechanism over a sequence of attention layer inputs of the attention layer.

The hierarchical attention block may be configured to determine that a caching criterion is satisfied and in response add the input sequence to the sequence of memory block inputs and generating a new partition that includes the input sequence.

The network input may be a sequence of observations each characterizing a respective state of an environment interacted with by an agent and the network output is a policy output for controlling the agent to perform an action in response to a last observation in the sequence of observations.

According to another aspect, there is provided a computer-implemented method of receiving a network input;

and processing the network input using the attention neural network of the above system aspect to generate a network output.

The method may further comprise training the neural network based on optimizing a self-supervised loss function that evaluates a difference between a training input and a reconstructed training input generated by using the attention neural network.

The training input may comprise image data or text data.

According to another aspect, there is provided an agent configured to receive a sequence of observations each characterizing a respective state of an environment interacted with by the agent, and to perform an action in response to a last observation in the sequence of observations; the agent comprising the system of the above system aspect, wherein the network input is the sequence of observations, and the network output is a policy output for controlling the agent to perform the action.

The agent may be a mechanical or electronic agent, wherein the environment may be a real-world environment, and wherein the observations may comprise observations of the real-world environment, and wherein the action may be an action to be performed by the agent in the real-world environment to perform a task whilst interacting with the real-world environment.

According to a further aspect, there is provided a computer storage medium encoded with instructions that, when executed by one or more computers, cause the one or more computers to perform the operations of the above system aspect.

It will be appreciated that features described in the context of one aspect may be combined with features described in the context of another aspect.

The subject matter described in this specification can be implemented in particular embodiments so as to realize one or more of the following advantages.

The techniques described in this specification allow a neural network system to perform sequential tasks (e.g., processing input sequences, generating output sequences, or both) that achieve results that are comparable to or even exceed the state-of-the-art by using a hierarchical attention mechanism while consuming many fewer computational resources (e.g., memory, computing power, or both), i.e., relative to conventional attention-based neural networks, which require nontrivial computational overhead due to their adoption of existing attention mechanisms such as self-attention mechanism and multi-headed attention mechanism. Conventional attention mechanisms can be ineffective over long range sequential tasks, much less sequential tasks in which only sparse learning signals are available, e.g., in the setting of reinforcement learning (RL) training. Even when augmented with episodic memories, which can aid in preservation of salient information from the past over longer timescales, conventional attention mechanisms often struggle with tasks that require recalling a temporally-structured event from the past, rather than simply and efficiently recalling one single past state.

In more detail, by generating and maintaining a set of memory summary keys that correspond to different partitions of a sequence of previously processed memory block inputs by using information derived from the sequence of memory block inputs, the described neural network can effectively perform a given task through a hierarchical attention scheme, i.e., by first attending to most relevant partitions that have been identified according to their relevance measures with respect the input sequence, and then attending within the most relevant partitions in further detail, so as to reason over memory block inputs included within the most relevant partitions to generate an attended input sequence for the input sequence.

The network output may be generated using the attended input sequence, e.g. by applying a feed-forward, recurrent, or other transformation to the attended input sequence. As one example, when the network input is an input sequence, the system may comprise an encoder neural network that includes the one or more hierarchical attention blocks and that encodes the input sequence to generate a respective encoded representation of each input in the sequence. The neural network then includes a decoder neural network (that, in turn, includes one or more output layers) that processes the encoded representation of the inputs to generate the network output. As another example, the system can include a decoder neural network that includes the one or more blocks and that processes an encoded representation of the network input to generate the network output. As a further example, the neural network system can include an embedding subnetwork that generates a sequence of embeddings from the network input, followed by a sequence of a plurality of hierarchical attention blocks that each update the sequence of embeddings, and one or more output layers that generate the network output from the output sequence generated by the last block in the sequence.

The techniques described in this specification can thus allow a neural network system to achieve improved performance on a range of tasks across a wide variety of technical domains, including RL agent control tasks that require learning from, interacting with, or adapting to complex environments that are spatially or temporally extended or both.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 shows a quantitative example of the performance gains that can be achieved by using the attention neural network described in this specification.

Like reference numbers and designations in the various drawings indicate like elements.

DETAILED DESCRIPTION

Figure 1:
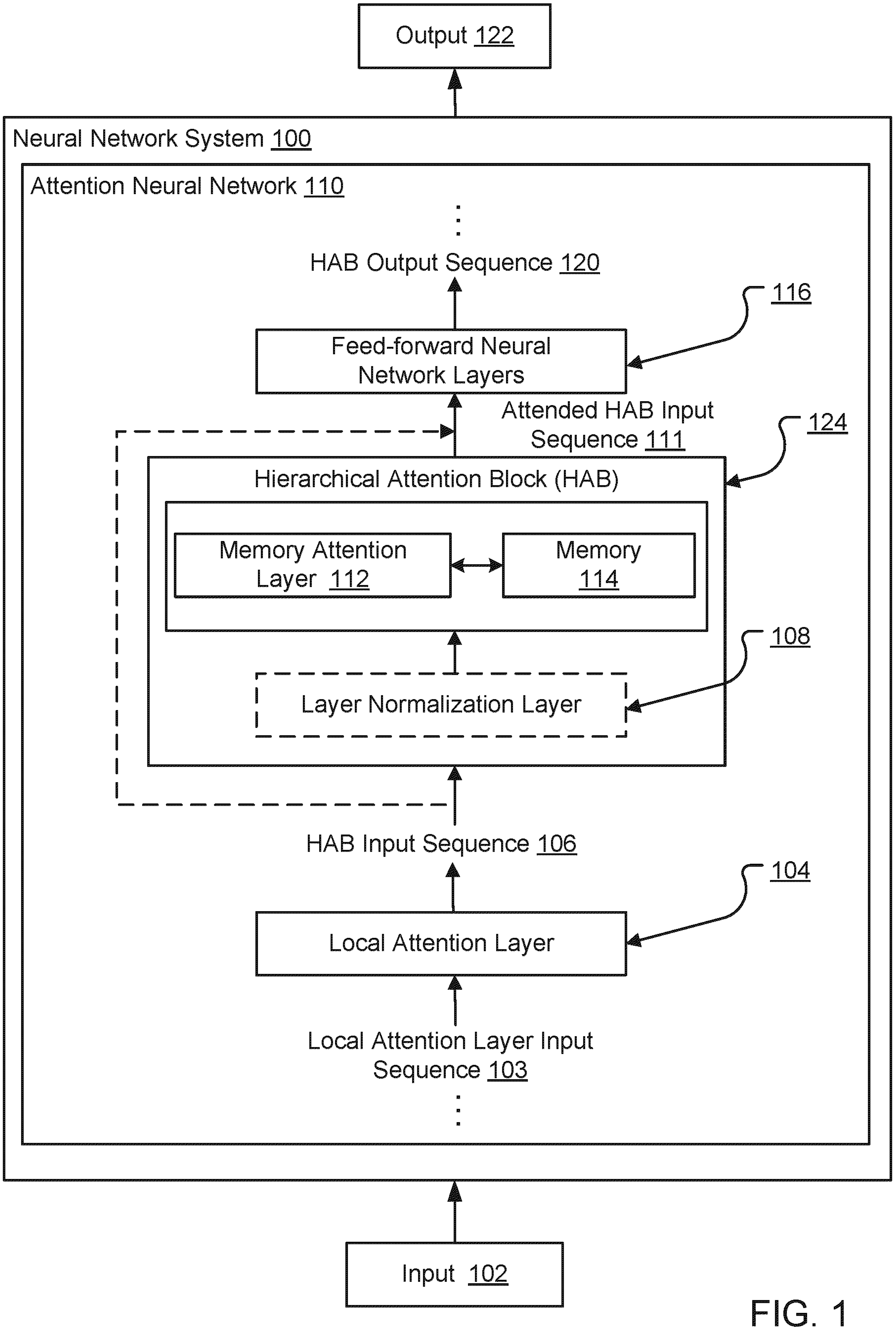
FIG. 1 shows an example neural network system including an attention neural network that includes a hierarchical attention block.

FIG. 1 shows an example neural network system 100. The neural network system 100 is an example of a system implemented as computer programs on one or more computers in one or more locations, in which the systems, components, and techniques described below can be implemented. The neural network system 100 receives an input 102 and performs a machine learning task by processing the input 102 to generate an output 122. The neural network system 100 includes an attention neural network 110. The attention neural network 110 includes a hierarchical attention block 124.

The machine learning task can be any machine learning task that (i) operates on a network input that is an input sequence, (ii) generates a network output that is an output sequence, or (iii) both.

Some examples of machine learning tasks that the system can be configured to perform follow.

For example, the neural network system 100 may be a reinforcement learning system that selects actions to be performed by a reinforcement learning agent interacting with an environment. In order for the agent to interact with the environment, the system may receive an input 102 that includes a sequence of observations characterizing different states of the environment. The system may generate an output 122 that specifies one or more actions to be performed by the agent in response to the received input sequence, i.e., in response to the last observation in the sequence. That is, the sequence of observations includes a current observation characterizing the current state of the environment and one or more historical observations characterizing past states of the environment.

In some implementations, the environment is a real-world environment, the agent is a mechanical agent interacting with the real-world environment, e.g., a robot or an autonomous or semi-autonomous land, air, or sea vehicle operating in or navigating through the environment, and the actions are actions taken by the mechanical agent in the real-world environment to perform the task. For example, the agent may be a robot interacting with the environment to accomplish a specific task, e.g., to locate an object of interest in the environment or to move an object of interest to a specified location in the environment or to navigate to a specified destination in the environment.

In these implementations, the observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control signals to control the robot or other mechanical agent, e.g., torques for the joints of the robot or higher-level control commands, or the autonomous or semi-autonomous land, air, sea vehicle, e.g., torques to the control surface or other control elements e.g. steering control elements of the vehicle, or higher-level control commands. The control signals can include for example, position, velocity, or force/torque/acceleration data for one or more joints of a robot or parts of another mechanical agent. The control signals may also or instead include electronic control data such as motor control data, or more generally data for controlling one or more electronic devices within the environment the control of which has an effect on the observed state of the environment. For example in the case of an autonomous or semi-autonomous land or air or sea vehicle the control signals may define actions to control navigation e.g. steering, and movement e.g., braking and/or acceleration of the vehicle.

In some implementations the environment is a simulation of the above-described real-world environment, and the agent is implemented as one or more computers interacting with the simulated environment. For example the simulated environment may be a simulation of a robot or vehicle and the reinforcement learning system may be trained on the simulation and then, once trained, used in the real-world.

In some implementations the environment is a real-world manufacturing environment for manufacturing a product, such as a chemical, biological, or mechanical product, or a food product. As used herein "manufacturing" a product also includes refining a starting material to create a product, or treating a starting material e.g. to remove pollutants, to generate a cleaned or recycled product. The manufacturing plant may comprise a plurality of manufacturing units such as vessels for chemical or biological substances, or machines, e.g. robots, for processing solid or other materials. The manufacturing units are configured such that an intermediate version or component of the product is moveable between the manufacturing units during manufacture of the product, e.g. via pipes or mechanical conveyance. As used herein manufacture of a product also includes manufacture of a food product by a kitchen robot.

The agent may comprise an electronic agent configured to control a manufacturing unit, or a machine such as a robot, that operates to manufacture the product. That is, the agent may comprise a control system configured to control the manufacture of the chemical, biological, or mechanical product. For example the control system may be configured to control one or more of the manufacturing units or machines or to control movement of an intermediate version or component of the product between the manufacturing units or machines.

As one example, a task performed by the agent may comprise a task to manufacture the product or an intermediate version or component thereof. As another example, a task performed by the agent may comprise a task to control, e.g. minimize, use of a resource such as a task to control electrical power consumption, or water consumption, or the consumption of any material or consumable used in the manufacturing process.

The actions may comprise control actions to control the use of a machine or a manufacturing unit for processing a solid or liquid material to manufacture the product, or an intermediate or component thereof, or to control movement of an intermediate version or component of the product within the manufacturing environment e.g. between the manufacturing units or machines. In general the actions may be any actions that have an effect on the observed state of the environment, e.g. actions configured to adjust any of the sensed parameters described below. These may include actions to adjust the physical or chemical conditions of a manufacturing unit, or actions to control the movement of mechanical parts of a machine or joints of a robot. The actions may include actions imposing operating conditions on a manufacturing unit or machine, or actions that result in changes to settings to adjust, control, or switch on or off the operation of a manufacturing unit or machine.

The rewards or return may relate to a metric of performance of the task. For example in the case of a task that is to manufacture a product the metric may comprise a metric of a quantity of the product that is manufactured, a quality of the product, a speed of production of the product, or to a physical cost of performing the manufacturing task, e.g. a metric of a quantity of energy, materials, or other resources, used to perform the task. In the case of a task that is to control use of a resource the matric may comprise any metric of usage of the resource.

In general observations of a state of the environment may comprise any electronic signals representing the functioning of electronic and/or mechanical items of equipment. For example a representation of the state of the environment may be derived from observations made by sensors sensing a state of the manufacturing environment, e.g. sensors sensing a state or configuration of the manufacturing units or machines, or sensors sensing movement of material between the manufacturing units or machines. As some examples, such sensors may be configured to sense mechanical movement or force, pressure, temperature; electrical conditions such as current, voltage, frequency, impedance; quantity, level, flow/movement rate or flow/movement path of one or more materials; physical or chemical conditions e.g. a physical state, shape or configuration or a chemical state such as pH; configurations of the units or machines such as the mechanical configuration of a unit or machine, or valve configurations; image or video sensors to capture image or video observations of the manufacturing units or of the machines or movement; or any other appropriate type of sensor. In the case of a machine such as a robot, the observations from the sensors may include observations of position, linear or angular velocity, force, torque or acceleration, or pose of one or more parts of the machine, e.g. data characterizing the current state of the machine or robot or of an item held or processed by the machine or robot. The observations may also include, for example, sensed electronic signals such as motor current or a temperature signal, or image or video data for example from a camera or a LIDAR sensor. Sensors such as these may be part of or located separately from the agent in the environment.

In some implementations the environment is the real-world environment of a service facility comprising a plurality of items of electronic equipment, such as a server farm or data center, for example a telecommunications data center, or a computer data center for storing or processing data, or any service facility. The service facility may also include ancillary control equipment that controls an operating environment of the items of equipment, for example environmental control equipment such as temperature control e.g. cooling equipment, or air flow control or air conditioning equipment. The task may comprise a task to control, e.g. minimize, use of a resource, such as a task to control electrical power consumption, or water consumption. The agent may comprise an electronic agent configured to control operation of the items of equipment, or to control operation of the ancillary, e.g. environmental, control equipment.

In general the actions may be any actions that have an effect on the observed state of the environment, e.g. actions configured to adjust any of the sensed parameters described below. These may include actions to control, or to impose operating conditions on, the items of equipment or the ancillary control equipment, e.g. actions that result in changes to settings to adjust, control, or switch on or off the operation of an item of equipment or an item of ancillary control equipment.

In general observations of a state of the environment may comprise any electronic signals representing the functioning of the facility or of equipment in the facility. For example a representation of the state of the environment may be derived from observations made by any sensors sensing a state of a physical environment of the facility or observations made by any sensors sensing a state of one or more of items of equipment or one or more items of ancillary control equipment. These include sensors configured to sense electrical conditions such as current, voltage, power or energy; a temperature of the facility; fluid flow, temperature or pressure within the facility or within a cooling system of the facility; or a physical facility configuration such as whether or not a vent is open.

The rewards or return may relate to a metric of performance of the task. For example in the case of a task to control, e.g. minimize, use of a resource, such as a task to control use of electrical power or water, the metric may comprise any metric of use of the resource.

In some implementations the environment is the real-world environment of a power generation facility e.g. a renewable power generation facility such as a solar farm or wind farm. The task may comprise a control task to control power generated by the facility, e.g. to control the delivery of electrical power to a power distribution grid, e.g. to meet demand or to reduce the risk of a mismatch between elements of the grid, or to maximize power generated by the facility. The agent may comprise an electronic agent configured to control the generation of electrical power by the facility or the coupling of generated electrical power into the grid. The actions may comprise actions to control an electrical or mechanical configuration of an electrical power generator such as the electrical or mechanical configuration of one or more renewable power generating elements e.g. to control a configuration of a wind turbine or of a solar panel or panels or mirror, or the electrical or mechanical configuration of a rotating electrical power generation machine. Mechanical control actions may, for example, comprise actions that control the conversion of an energy input to an electrical energy output, e.g. an efficiency of the conversion or a degree of coupling of the energy input to the electrical energy output. Electrical control actions may, for example, comprise actions that control one or more of a voltage, current, frequency or phase of electrical power generated.

The rewards or return may relate to a metric of performance of the task. For example in the case of a task to control the delivery of electrical power to the power distribution grid the metric may relate to a measure of power transferred, or to a measure of an electrical mismatch between the power generation facility and the grid such as a voltage, current, frequency or phase mismatch, or to a measure of electrical power or energy loss in the power generation facility. In the case of a task to maximize the delivery of electrical power to the power distribution grid the metric may relate to a measure of electrical power or energy transferred to the grid, or to a measure of electrical power or energy loss in the power generation facility.

In general observations of a state of the environment may comprise any electronic signals representing the electrical or mechanical functioning of power generation equipment in the power generation facility. For example a representation of the state of the environment may be derived from observations made by any sensors sensing a physical or electrical state of equipment in the power generation facility that is generating electrical power, or the physical environment of such equipment, or a condition of ancillary equipment supporting power generation equipment. Such sensors may include sensors configured to sense electrical conditions of the equipment such as current, voltage, power or energy; temperature or cooling of the physical environment; fluid flow; or a physical configuration of the equipment; and observations of an electrical condition of the grid e.g. from local or remote sensors. Observations of a state of the environment may also comprise one or more predictions regarding future conditions of operation of the power generation equipment such as predictions of future wind levels or solar irradiance or predictions of a future electrical condition of the grid.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In a similar way the environment may be a drug design environment such that each state is a respective state of a potential pharmachemical drug and the agent is a computer system for determining elements of the pharmachemical drug and/or a synthetic pathway for the pharmachemical drug. The drug/synthesis may be designed based on a reward derived from a target for the drug, for example in simulation. As another example, the agent may be a mechanical agent that performs or controls synthesis of the drug.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

In some cases, the observations may include textual or spoken instructions provided to the agent by a third-party (e.g., an operator of the agent). For example, the agent may be an autonomous vehicle, and a user of the autonomous vehicle may provide textual or spoken instructions to the agent (e.g., to navigate to a particular location).

As another example the environment may be an electrical, mechanical or electro-mechanical design environment, e.g. an environment in which the design of an electrical, mechanical or electro-mechanical entity is simulated. The simulated environment may be a simulation of a real-world environment in which the entity is intended to work. The task may be to design the entity. The observations may comprise observations that characterize the entity, i.e. observations of a mechanical shape or of an electrical, mechanical, or electro-mechanical configuration of the entity, or observations of parameters or properties of the entity. The actions may comprise actions that modify the entity e.g. that modify one or more of the observations. The rewards or return may comprise one or more metric of performance of the design of the entity. For example rewards or return may relate to one or more physical characteristics of the entity such as weight or strength or to one or more electrical characteristics of the entity such as a measure of efficiency at performing a particular function for which the entity is designed. The design process may include outputting the design for manufacture, e.g. in the form of computer executable instructions for manufacturing the entity. The process may include making the entity according to the design. Thus a design of an entity may be optimized, e.g. by reinforcement learning, and then the optimized design output for manufacturing the entity, e.g. as computer executable instructions; an entity with the optimized design may then be manufactured.

As previously described the environment may be a simulated environment. Generally in the case of a simulated environment the observations may include simulated versions of one or more of the previously described observations or types of observations and the actions may include simulated versions of one or more of the previously described actions or types of actions. For example the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle. Generally the agent may be implemented as one or more computers interacting with the simulated environment.

The simulated environment may be a simulation of a particular real-world environment and agent. For example, the system may be used to select actions in the simulated environment during training or evaluation of the system and, after training, or evaluation, or both, are complete, may be deployed for controlling a real-world agent in the particular real-world environment that was the subject of the simulation. This can avoid unnecessary wear and tear on and damage to the real-world environment or real-world agent and can allow the control neural network to be trained and evaluated on situations that occur rarely or are difficult or unsafe to re-create in the real-world environment. For example the system may be partly trained using a simulation of a mechanical agent in a simulation of a particular real-world environment, and afterwards deployed to control the real mechanical agent in the particular real-world environment. Thus in such cases the observations of the simulated environment relate to the real-world environment, and the selected actions in the simulated environment relate to actions to be performed by the mechanical agent in the real-world environment.

Optionally, in any of the above implementations, the observation at any given time step may include data from a previous time step that may be beneficial in characterizing the environment, e.g., the action performed at the previous time step, the reward received at the previous time step, or both.

As another example, the neural network system 100 may be a neural machine translation system configured to perform a neural machine translation task. For example, if the input to the neural network system 100 is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language—target language pairs. In this example, the source language text may be augmented with an identifier that indicates the target language into which the neural network should translate the source language text.

As another example, the neural network system 100 may be an audio processing system configured to perform an audio processing task. For example, if the input to the neural network system is a sequence representing a spoken utterance, e.g., a spectrogram or a waveform or features of the spectrogram or waveform, the output generated by the neural network system may be a piece of text that is a transcript for the utterance. As another example, if the input to the neural network system is a sequence representing a spoken utterance, the output generated by the neural network system can indicate whether a particular word or phrase ("hotword") was spoken in the utterance. As another example, if the input to the neural network system is a sequence representing a spoken utterance, the output generated by the neural network system can identify the natural language in which the utterance was spoken.

As another example, the neural network system 100 may be a natural language processing system configured to perform a natural language processing or understanding task, e.g., an entailment task, a paraphrase task, a textual similarity task, a sentiment task, a sentence completion task, a grammaticality task, and so on, that operates on a sequence of text in some natural language.

As another example, the neural network system 100 may be a text to speech system configured to perform a text to speech task, where the input is text in a natural language or features of text in a natural language and the network output is a spectrogram, a waveform, or other data defining audio of the text being spoken in the natural language.

As another example, the neural network system 100 may be part of a computer-assisted health prediction system configured to perform a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the neural network system 100 may be a text processing system configured to perform a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the neural network system 100 may be an image processing system configured to perform an image generation task, where the input is a conditioning input and the output is a sequence of intensity value inputs for the pixels of an image.

As another example, the neural network system 100 may be a computer vision system configured to perform a computer vision task, where the input is an image or a point cloud and the output is a computer vision output for the image or point cloud, e.g., a classification output that includes a respective score for each of a plurality of categories, with each score representing the likelihood that the image or point cloud includes an object belonging to the category. When the input is an image or point cloud, the neural network system 100 can include an embedding subnetwork that generates a respective embedding for each multiple patches of the image or point cloud, and the input to the first block of the neural network can be a sequence that includes the respective embeddings (and, optionally, one or more additional embeddings, e.g., at a predetermined position that will later be used to generate the output). Each patch includes the intensity values of the pixels in a different region of the input image.

As another example, the neural network system 100 may be part of a genomics data analysis or processing system configured to perform a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

While FIG. 1 illustrates one hierarchical attention block 124, the attention neural network 110 may include multiple, e.g., two, four, six or more, hierarchical attention blocks arranged in a stack one after the other and, optionally, other components. For example, in the cases where the neural network system 100 is configured as a reinforcement learning system that selects actions to be performed by a reinforcement learning agent interacting with an environment, the attention neural network 110 may include an input encoder network and an output decoder network, in addition to the stack of multiple hierarchical attention blocks. In this example, when the inputs 102 include images, the input encoder network may be configured as a convolutional neural network, i.e., that includes one or more convolutional neural network layers, to process the image to generate an encoded representation for the input 102. The encoded representation may then be provided as input to another component in the attention neural network 110, e.g., to a local attention layer 104 or to the hierarchical attention block 124. When the inputs 102 include lower-dimensional data such as text data, the input encoder network may be configured to have one or more fully-connected neural network layers, one or more long short-term memory (LSTM) neural network layers, or both.

In this example, the output decoder network may be configured to process the attention block output of a last hierarchical attention block in the stack to generate an output 122 that can be used to determine an action to be performed by the agent at each of multiple time steps. For example, the output can include respective Q value outputs for the possible actions, and the system 300 can select the action to be performed by the agent, e.g., by sampling an action in accordance with the Q values (or probability values derived from the Q values) for the actions, or by selecting the action with the highest Q value. For each action, the corresponding Q value is a prediction of expected return resulting from the agent performing the action.

During the processing of an input 102 by the attention neural network 110, the hierarchical attention block 124 obtains, as input to the block 124, an hierarchical attention block (HAB) input sequence 106. The HAB input sequence 106 can include a respective block input, which can be in the form of a vector, at each of a plurality of positions in a HAB input sequence order.

In the example implementation of FIG. 1, the HAB input sequence 106 is generated by a local attention neural network layer 104 arranged preceding to the block 124, although in other implementations, the input sequence 106 can alternatively be generated by another neural network layer, e.g., an embedding layer, a convolutional layer, or a long short-term memory (LSTM) layer, that is arranged preceding to the block 124 in the attention neural network 110.

The hierarchical attention block 124 in turn includes a memory attention layer 112 that is configured to receive the HAB input sequence 106 for the block 124, and, optionally, a layer normalization layer 108 that precedes the memory attention layer 112. When included, the layer normalization layer 108 applies layer normalization to the HAB input sequence 106. The output of this layer normalization layer 108 can then be used as the input sequence of the memory attention layer 112 included in the hierarchical attention block 124.

The local attention layer 104 is a neural network layer which can receive a local attention layer input sequence 103 and apply a local attention mechanism on the input sequence 103 to generate an local attended input sequence, which is then used as the HAB input sequence 106 for the hierarchical attention block 124. For example, the local attention layer input sequence 103 can be, or derive from, the input 102 to the neural network system 100.

The local attention mechanism applied by the local attention layer 104 can be a self-attention mechanism, e.g., a multi-head self-attention mechanism, or other suitable attention mechanisms that have been described in more detail in Vaswani, et al., *Attention Is All You Need*, arXiv: 1706.03762, and in Devlin, et al., *Bert: Pre-training of deep bidirectional transformers for language understanding*. In Proceedings of the 2019 Conference of the North American Chapter of the Association for Computational Linguistics: Human Language Technologies, Volume 1 (Long and Short Papers), pp. 4171-4186, 2019, the entire contents of which are hereby incorporated by reference herein in their entirety.

Generally, an attention mechanism maps a query and a set of key-value pairs to an output, where the query, keys, and values are all vectors derived from an input to the attention mechanism based on respective matrices. The output is computed as a weighted sum of the values, where the weight assigned to each value is computed by a compatibility function, e.g., a dot product or scaled dot product, of the query with the corresponding key.

In context of this specification, a local attention mechanism refers to an attention mechanism that determines an output from just the input sequence to the attention mechanism. For example, a self-attention mechanism that can be applied by the local attention neural network layer 104 relates different positions in the same sequence, i.e., the local attention layer input sequence 103, to determine a transformed version of the sequence as an output. The local attention layer input sequence 103 can include a vector for each element of the input sequence. These vectors provide an input to the self-attention mechanism and are used by the self-attention mechanism to generate a new representation of the same sequence as the attention layer output, which can similarly include a vector for each element of the input sequence. An output of the self-attention mechanism can be used as the HAB input sequence 106, which is then provided as input to the hierarchical attention block 124.

The memory attention layer 112 included in the hierarchical attention block 124 can receive the HAB input sequence 106 and apply a memory attention mechanism on the HAB input sequence 106 to generate an attended HAB input sequence 111 for the hierarchical attention block 124.

The memory attention mechanism will be described in more detail below.

The feed-forward neural network layers 116 that are arranged subsequent to the hierarchical attention block 124 can then operate, i.e., apply a sequence of feed-forward transformations, on the attended HAB input sequence 111 to generate an HAB output sequence 120 for the block. Alternatively, in the implementations where a skip connection (as shown by the dashed arrow in FIG. 1) is arranged, the feed-forward layers can operate on a combination, e.g., concatenation or summation, of the attended HAB input sequence 111 and the HAB input sequence 106 to generate the HAB output sequence 120. For example, the sequence of feed-forward transformations can include two or more learned linear transformations each separated by an activation function, e.g., a non-linear elementwise activation function, e.g., a ReLU activation function.

The HAB output sequence 120 may be provided as input to a next hierarchical attention block or other components of the attention neural network 110 for further processing, or may be used to generate the output 122 of the neural network system 100.

The attention neural network 110 may include one or more output layers that are configured to receive the output of a final hierarchical attention block of the one or more hierarchical attention blocks in the attention neural network 110. The one or more output layers are configured to process the output sequence of the final hierarchical attention block to generate the output 122 of the neural network system 100 for the machine learning task. For example, in the cases where the neural network system 100 is configured as a reinforcement learning system that controls an agent, a first output layer can first project the output sequence into the appropriate dimensionality for the number of possible actions that can be performed by an agent at any given time step. Then, a second output layer can apply a softmax activation function to the projected output sequence to generate a respective score for each of multiple possible actions.

The hierarchical attention block 124 implements a memory attention mechanism that uses not only an input sequence to the attention mechanism but also data stored in a memory 114 to determine an output of the attention mechanism. In particular, the hierarchical attention block 124 uses a hierarchical strategy to attend over data that has been previously processed by the attention neural network 110 when performing the machine learning task. The previously processed data is stored in the memory 114 of the system 100. A minimal unit of data item stored in the memory is referred to as a "memory block input," which can be similarly in the form of a vector. The memory block inputs can be temporally ordered in multiple partitions or segmentations. Each partition can be identified by a respective one of a set of memory summary keys, or for short, summaries.

In some implementations, the partitions can be stored sequentially in a temporal order in which the information was processed, with the most obsolete data stored at the beginning of the sequence of partitions. In some implementations, the corresponding memory summary key that identifies each partition can be generated from the partition by using a transformation function, e.g., by applying a mean or max pooling function across the memory block inputs within the partition. In some implementations, the memory summary keys and the corresponding partitions of memory block inputs can be stored in the memory 114 in a key-value format.

The memory 114 can be implemented as one or more logical or physical storage devices, and can be integrated with the neural network system 100, or can alternatively be external to the neural network system 100 that is accessible through a data communication network. For example, the memory 114 can be implemented in the storage areas provided by a local memory, e.g., an on-chip high bandwidth memory, of a hardware accelerator on which the neural network system 100 is deployed. In cases where the attention neural network 110 includes multiple hierarchical attention blocks 124, the neural network system 100 can maintain a single memory for all hierarchical attention blocks, or different memories for different hierarchical attention blocks.

Generally, when the system 100 is performing a machine learning task, the data to be sent for storage in the memory 114 can be or derived from any data that has been previously processed, i.e., received or generated or both, by the attention neural network 110 since the beginning of the performance of the machine learning task. In some implementations, the stored data is discarded once the task is completed. For example, the memory 114 may be reset between different tasks that each require reasoning over a long-range document, e.g., multiple contiguous articles or a full-length book. In other implementations, the stored data is kept in the memory and can be carried over for use by the hierarchical attention block 124 when performing another task. For example, the memory 114 may not be reset between the same or different agent control tasks that each require reasoning over a long sequence of observations generated while an agent interacts with an environment to perform the task, thereby allowing the attention neural network 110 to selectively attend to further historic data.

For example, the data to be sent for storage in the memory 114 can include a previously received input 102 or a previously received portion of the input 102 (in the cases where the input 102 is an input sequence), the local attention layer input sequence 103, the HAB input sequence 106, or some other intermediate data or a combination thereof that have been processed by different components of the attention neural network 110.

To generate the attended input sequence 111, the hierarchical attention block 124 first uses the set of memory summary keys to identify the relevant memory partitions, and then attends only to the memory block inputs within each identified relevant memory partition, and not to the memory block inputs within any other memory partitions, by using an attention mechanism of the memory attention layer 112. In some implementations, the attention mechanism of the memory attention layer 112 can be a multi-head self-attention mechanism which operates on both the (normalized) HAB input sequence 106 and the memory block inputs within the identified, relevant memory partitions stored in the memory 114. This approach combines benefits of the sparse and relatively long-term recall ability of existing episodic memories with the short-term sequential and reasoning power of standard attention mechanisms, and therefore achieves better performance on various machine learning tasks, particularly those that require flexible and effective recall and reasoning capabilities. In some implementations, the hierarchical attention block 124 (or more than one hierarchical attention block 124) may be part of a transformer layer to supplement standard attention.

Figure 2:
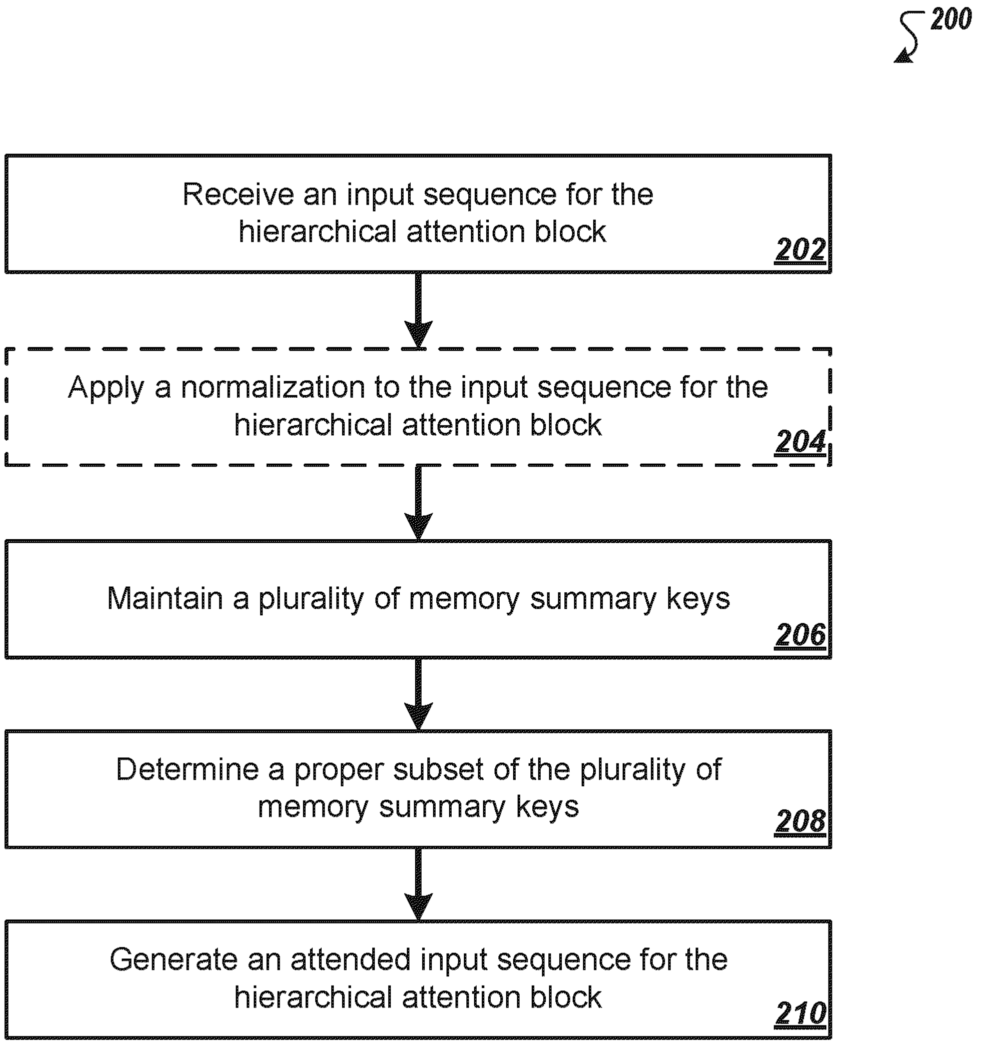
FIG. 2 is a flow diagram of an example process for generating an attended input sequence for a hierarchical attention block of an attention neural network from an input sequence.

FIG. 2 is a flow diagram of an example process 200 for generating an attended input sequence for a hierarchical attention block of an attention neural network from an input sequence. For convenience, the process 200 will be described as being performed by a system of one or more computers located in one or more locations. For example, a neural network system, e.g., the neural network system 100 of FIG. 1, appropriately programmed in accordance with this specification, can perform the process 200.

The system receives, at the hierarchical attention block, a hierarchical attention block (HAB) input sequence for the hierarchical attention block that has a respective block input, which can be in the form of a vector, at each of a plurality of input positions in an input sequence order (step 202).

In general, the HAB input sequence for the hierarchical attention block is derived from an input of the neural network system. For example, the HAB input sequence for the hierarchical attention block can be or otherwise derive from an output of a preceding layer, e.g., a local attention layer or another neural network layer, included in the attention neural network.

In some implementations, the hierarchical attention block is configured to apply a normalization to the HAB input sequence for the hierarchical attention block by using a layer normalization layer included in the block (step 204). The hierarchical attention block can then provide the normalized HAB input sequence as input to the memory attention layer. In other implementations, the hierarchical attention block can provide the received HAB input sequence as input to the memory attention layer.

In particular, the system maintains, in a memory that is either local or remote to the system, data that has been previously processed by the attention neural network when the system was performing the given machine learning task.

The memory can store a sequence of memory block inputs that has a respective memory block input at each of a plurality of memory positions in a memory sequence order. For example, the memory sequence order can be a temporal order in which the memory block inputs were previously processed by the attention neural network when performing the machine learning task.

The sequence of memory block inputs can be stored in the memory in multiple fixed-length partitions, with each partition being composed of the same number of memory block inputs as each other partition. The partitions can be similarly maintained in accordance with the memory sequence order of the respective memory block inputs included therein.

In various implementations, the data to be sent for storage in the memory can include an earlier, already processed portion of the input (in the cases where the input is an input sequence) to the system, the local attention layer input sequence, the HAB input sequence, or some other intermediate data or a combination thereof that have been processed by different components of the attention neural network.

In one example, the local attention layer input sequences that have been provided as input to the local attention layer for the given task can be stored in the memory. In this example, each memory block input stored in the memory can correspond to a respective vector included in a local attention layer input sequence that has previously been received by the local attention layer. In this example, the memory block inputs can be maintained in the memory in a time sequential order in which the respective vector included in the local attention layer input sequence were received by the local attention layer when performing the machine learning task.

In some implementations, a caching criterion can be defined that specifies that the data processed by the attention neural network should be sent to the memory for storage whenever a size of the data exceeds a predetermined threshold, which can be a predetermined number of vectors (the predetermined number being generally greater than 1). Continuing the previous example, the system can determine that the caching criterion is satisfied at each of multiple time points when performing the machine learning task; and in response add a copy of a fixed number of vectors included in the local attention layer input sequence (that have been received since a previous time point by the local attention layer) to the sequence of memory block inputs stored in the memory, and generate a new partition in the memory that includes the fixed number of vectors as the latest stored memory block inputs.

In some implementations, the data to be sent for storage in the memory can be derived from the system's operation on an earlier portion of the input to the neural network system. For example, when the input is an input sequence, the earlier portion of the input can include a first portion of previous inputs that precede the current input in the sequence. In some other implementations, the data to be sent for storage in the memory can be derived from the system's operation on multiple earlier inputs to the neural network system when performing the same given task.

The system maintains, for the hierarchical attention block, a plurality of memory summary keys (step 206). Each memory summary key corresponds to a respective one of the plurality of partitions of the sequence of memory block inputs stored in the memory. The memory summary key for a given partition represents a summary of the memory block inputs in the given partition. To generate a memory summary key for each partition, the system can apply a mean or max pooling function across the memory block inputs within the partition. Additionally or alternatively, the system can employ a more sophisticated summarization approach, such as a learned compression mechanism described in Rae, Jack W., et al. "*Compressive transformers for long-range sequence modelling.*" arXiv preprint arXiv:1911.05507 (2019), so as to more effectively generate the memory summary keys.

The system determines, from the plurality of memory summary keys and a sequence of queries derived from the HAB input sequence for the block, a proper subset of the plurality of memory summary keys (step 208), i.e. a subset formed of one or more but not all of the plurality of memory summary keys. In particular, for each of the plurality of different partitions of the sequence of memory block inputs, the hierarchical attention block can use the corresponding memory summary key to determine a measure of relevance of the partition with respect to a sequence of queries derived from the HAB input sequence. The measure of relevance, which can be computed as a numeric score, is then be used to select which partition should be included in the proper subset.

Determining the proper subset will be described in more detail below with reference to FIG. 3.

The system generates an attended HAB input sequence for the hierarchical attention block (step 208). To generate the attended HAB input sequence from the received HAB input sequence and from the selected partitions of memory block inputs, the system can use a memory attention layer included in the hierarchical attention block to apply an attention mechanism over (i) the normalized HAB input sequence and (ii) the respective memory block inputs at the memory positions within the partitions of the sequence of memory block inputs that correspond to the proper subset of the plurality of memory summary keys.

Specifically, the system uses the normalized HAB input sequence to generate one or more queries for the attention mechanism, for example by applying a learned query transformation to each respective block input included in the normalized HAB input sequence to generate a corresponding query, or by using each respective block input, as is, as the corresponding query. The system uses the respective memory block inputs at the memory positions within the partitions to generate one or more keys and, in some cases, one or more values for the attention mechanism. In some implementations, each query, key, and value can be a respective vector. In some implementations, the attention mechanism is multi-head mechanism, and the memory attention layer applies multiple memory attention mechanisms in parallel by using different queries derived from the same normalized HAB input sequence to generate respective outputs for the multiple memory attention mechanisms, which are then combined to provide the attended HAB input sequence for the hierarchical attention block.

For example, let C denote the plurality of partitions, and the attended HAB input sequence for the hierarchical attention block ("memory query results") can be computed as:

$$\text{memory query results} = \sum_{i \in top\text{-}k\ from\ R} R_i \cdot MHA(\text{normed input}, C_i),$$

where MHA denotes the multi-head attention mechanism which uses queries derived from the normalized HAB input sequence, and keys/values derived from the respective memory block inputs at the memory positions within the partitions of the sequence of memory block inputs that correspond to the proper subset of the plurality of memory summary keys.

In this example, for each partition of the sequence of memory block inputs that corresponds to memory summary key in the proper subset of the plurality of memory summary keys, the system uses the attention memory layer to apply an attention mechanism between the input sequence and the respective memory block inputs at the memory positions within the partition to generate an initial attended input sequence. The system then determines a weighted combination of the initial attended input sequences, where each initial attended input sequence is weighted by the relevance score for the corresponding partition. The weighted combination of the initial attended input sequences is then used as the attended HAB input sequence for the hierarchical attention block.

After the attended HAB input sequence for the hierarchical attention block is generated, the system can apply a sequence of feed-forward transformations, by using the feed-forward neural network layers, to the attended HAB input sequence to generate a HAB sequence for the hierarchical attention block. In some implementations, a residual ("skip") connection is arranged between the feed-forward neural network layers and the local attention layer. In these implementations, the system determines a combination of the HAB input sequence (that is received through the residual connection) and the HAB attended input sequence, and the sequence of feed-forward transformations then operates on the combination to generate a HAB output sequence for the hierarchical attention block.

The system can provide the HAB output sequence as input to the next hierarchical attention block or other components of the attention neural network for further processing. If the hierarchical attention block is the final hierarchical attention block in the attention neural network, the system can provide the HAB output sequence to one or more output layers of the attention neural network that are configured to map the HAB output sequence to the output of the system.

The process 200 for generating an attended HAB input sequence from an HAB input sequence is referred to as a hierarchical attention scheme because the hierarchical attention block does so by first selecting the most relevant partitions of the sequence of memory block inputs that have been identified according to their relevance measures with respect the HAB input sequence, and then attending within the most relevant partitions in further detail.

Figure 3:
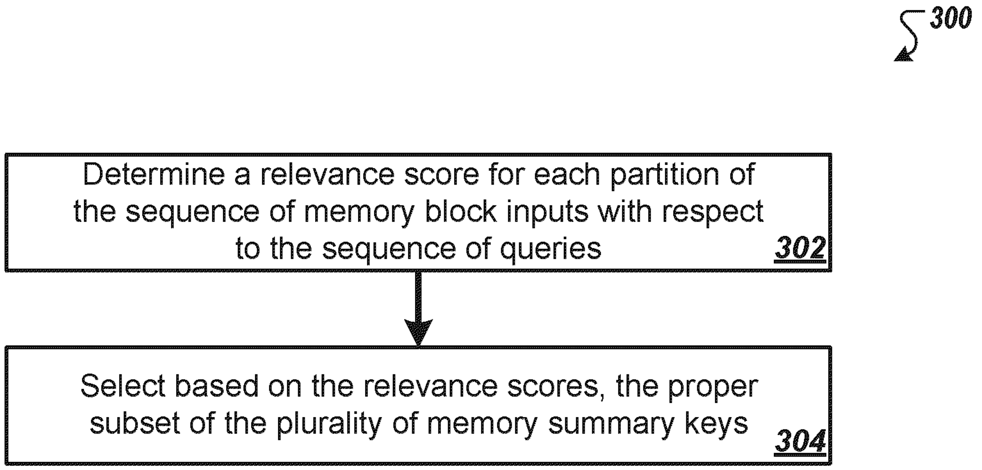
FIG. 3 is a flow diagram of an example process for determining a proper subset of a plurality of memory summary keys.

FIG. 3 is a flow diagram of an example process 300 for determining a proper subset of a plurality of memory summary keys. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system determines a relevance score for each partition of the sequence of memory block inputs with respect to the sequence of queries, including, for each query in the sequence of queries, computing a dot product between the query and each of the plurality of memory summary keys (step 302). To derive the sequence of queries from the HAB input sequence for the block, the system can apply a learned query linear transformation to the respective (normalized) block input at each of the plurality of input positions included the HAB input sequence for the block.

The system selects, based on the relevance scores, the proper subset of the plurality of memory summary keys from the plurality of memory summary keys that correspond to the respective partitions of the sequence of memory block inputs (step 304).

For example, let S denote a sequence of the memory summary key vectors and Q be a query linear transformation layer that produces a sequence of query vectors, and the relevance scores (R) for all partitions can be computed as:

$$R = \text{softmax}(Q(\text{normed imput}) \cdot S),$$

where the "normed input" is the normalized HAB input sequence for the hierarchical attention block. In particular, for each query vector, computing the relevance score can compute an inner product, e.g. a vector dot product, between the query vector and each memory summary key vector. A softmax function can then be applied across the computed products to provide the relevance score for each partition that corresponds to one of the memory summary key vectors in the sequence S. The relevance scores acts as weights for the partitions, as previously described. A total number of k partitions that have the highest relevance scores among all partitions can then be selected, where k is typically an integer that is smaller than the total number of partitions. In some implementations, k is a fixed number (e.g., one, four, sixteen, or the like) which can be specified by a user of the system, while in other implementations, k can be a varying number, the value of which can change from task to task.

Figure 4A:
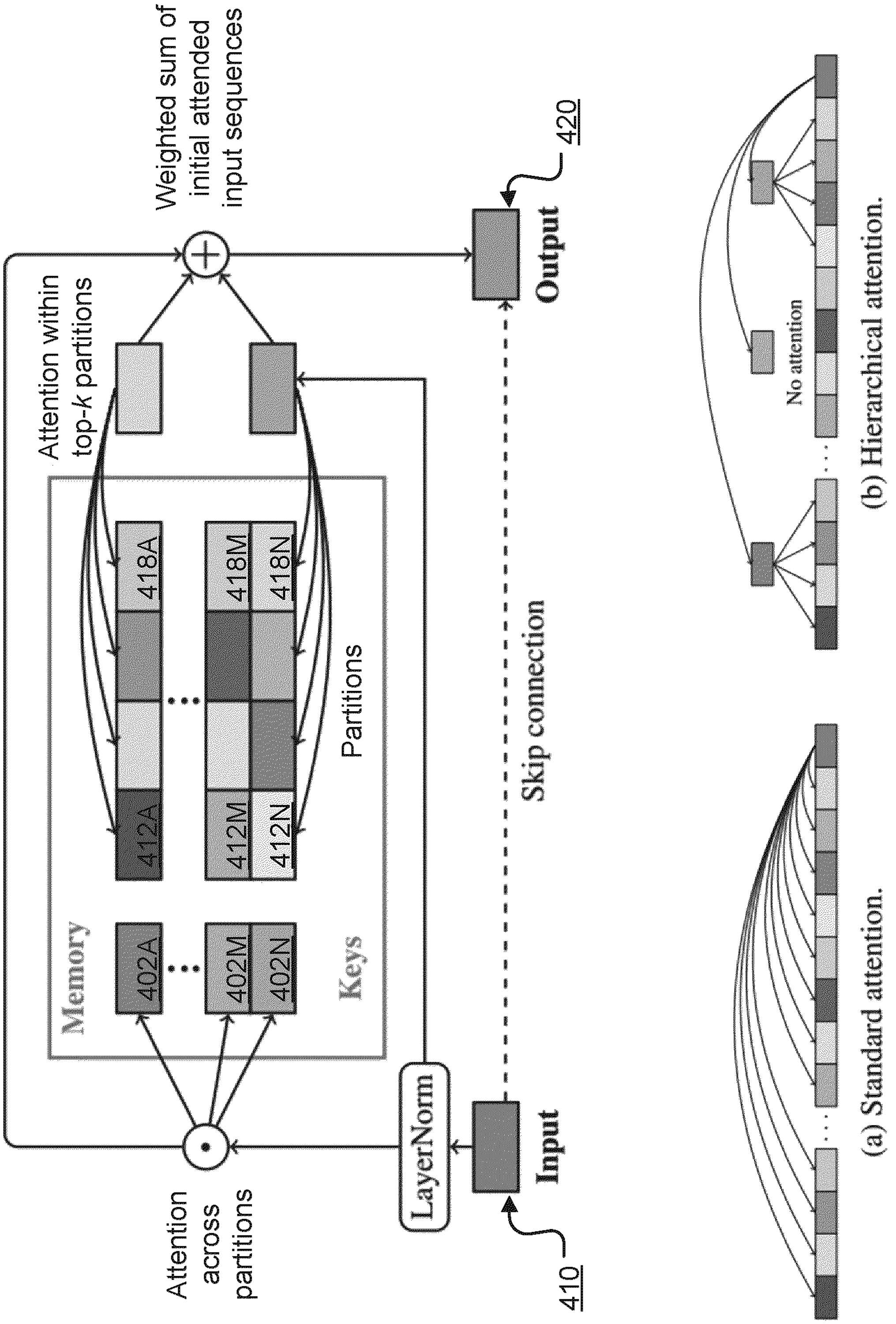
FIG. 4*a* shows an example illustration of applying hierarchical attention mechanism.

FIG. 4*a* shows an example illustration of applying hierarchical attention mechanism.

As illustrated on the top half of FIG. 4*a*, the system maintains memory block inputs in multiple partitions that are of a fixed length, e.g., a partition of memory block inputs 412A-418A. The system also maintains multiple memory summary keys, e.g., memory summary key 402A, each of which can be used to identify a corresponding partition.

When operating on an HAB input sequence 410 to generate an attended HAB input sequence 420, the system first attends to memory summary keys to select a proper subset of the memory summary keys, and then only attends, e.g., by using a multi-head attention mechanism, in greater detail within relevant partitions identified by the corresponding memory summary keys in the proper subset. The outputs of the attention mechanism are relevance-weighted and summed, and then added to the HAB input sequence 410 to produce the attended HAB input sequence 420 as output for the hierarchical attention block.

The bottom half of FIG. 4*a* illustrates a comparison between standard attention mechanism and the hierarchical attention mechanism described in this specification. Unlike the standard attention mechanism which attends to every input position in an input sequence, in hierarchical attention mechanism a top level attention is performed over the memory summary keys, and then a bottom level attention is performed within the top-k partitions. In this way, an attended HAB input at a given position in the attended HAB input sequence depends only on respective memory block input at the memory positions within the selected partitions, which have been selected according to the measure of relevance, and not on any respective memory block inputs at any other memory block positions.

Figure 4B:
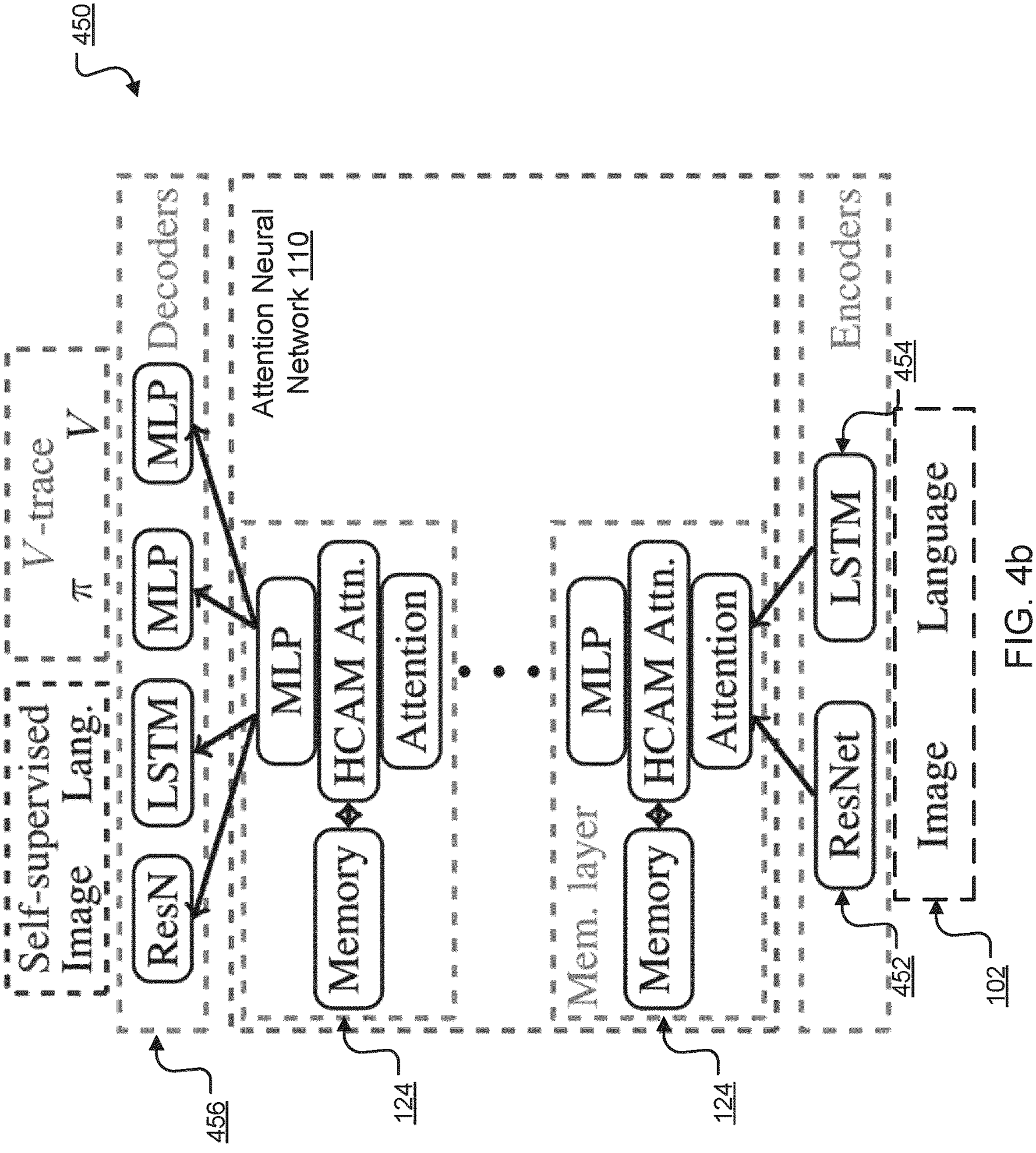
FIG. 4*b* shows an example illustration of a system for controlling an agent including a hierarchical attention mechanism.

FIG. 4*b* shows an example illustration of system 450, including an attention neural network 110 having a hierarchical attention mechanism as described above, configured for controlling an agent in an environment. The system 450 includes a plurality of hierarchical attention blocks 124, two in the illustrated example. The system 450 receives a network input 102 comprising an image observation that is processed using an image encoding neural network 452, e.g. a ResNet (a convolutional neural network with a residual connection) or other image processing neural network, configured to process the image observation to generate a representation of features of the image observation, e.g. as an image (embedding) vector. The network input 102 also comprises a language observation that is processed using a language encoding neural network 454, e.g. an LSTM or other e.g. recurrent neural network, configured to process the language observation to generate a representation of features of the language observation, e.g. as a language (embedding) vector. The image (embedding) vector and the language (embedding) vector provide an input to the attention neural networks 110. An output from the attention neural networks 110 is decoded using one or more decoders 456, e.g. feedforward or recurrent neural networks such as a ResNet, MLP, or LSTM. In the illustrated example one decoder generates an action selection policy output (π) that generate an output for selecting an action e.g. deterministically or stochastically. A decoder may also generate a state value output (V) for use in a reinforcement learning method such as V-trace (Espeholt et al., IMPALA, arXiv: 1802.01561) for training the agent to perform a task. A decoder may also decoder an image output e.g. for self-supervised learning as an auxiliary task, e.g. an image reconstruction task to reconstruct the image observation. A decoder may also decoder a language output e.g. for self-supervised learning as an auxiliary task, e.g. a language reconstruction task to reconstruct the language observation.

In general, the processes 200 and 300 can be performed as part of predicting a network output for a network input for which the desired output, i.e., the network output that should be generated by the system for the network input, is not known.

The processes 200 and 300 can also be performed as part of processing network inputs derived from a set of training data, i.e., network inputs derived from a set of inputs for which the output that should be generated by the attention neural network is known, in order to train the attention neural network to determine trained values for the network parameters, so that the system can be deployed for use in effectively performing a machine learning task.

The system can repeatedly perform the processes 200 and 300 on network inputs selected from a set of training data as part of a conventional machine learning training technique to train the attention neural network, e.g., a gradient descent with backpropagation training technique that uses a conventional optimizer, e.g., stochastic gradient descent, RMSprop, or Adam optimizer, to optimize an objective function that is specific to the machine learning task. During training, the system can incorporate any number of techniques to improve the speed, the effectiveness, or both of the training process. For example, the system can use hyperparameter sweep to determine how the attention neural network should be constructed, how it should be trained, or both. As another example, during training the system can apply a stop gradient operator to stop gradients from flowing into the memory. This reduces challenges with the non-differentiability of top-k selection. This also means that only past activations (and rather than the preceding computations) need to be stored in memory, and thus a relatively longer sequence of memory block inputs can be efficiently stored. As another example, the system can use the self-supervised learning technique described in Liu, Xiao, et al., "*Selfsupervised learning: Generative or contrastive*." arXiv preprint arXiv:2006.08218, 1(2), 2020 to train the attention neural network on certain tasks, including some agent control tasks where the sparse task rewards do not provide enough signal for the attention neural network to learn what to store in memory. For example, the self-supervised learning technique can use an auxiliary reconstruction loss function which evaluates a difference between a training input and a reconstructed training input generated by using the attention neural network, where the training input can include text data, e.g. in a natural language, image data, or both.

FIG. 5 shows a quantitative example of the performance gains that can be achieved by using a control neural network system described in this specification. Specifically, FIG. 5 shows a list of results achieved by an agent controlled using the neural network system 100 of FIG. 1 on a wide variety of technical tasks to be performed within complex and temporally-extended environments. Results are average performance (in terms of correctness percentage, where higher percentage scores indicate better results) across evaluations during the last 1% of training, except for the last row of the table ("One-Shot StreetLearn navigation" tasks), where they are average reward during the last 1% of training.

The environments include 2D environments, 3D environments, or both, that are characterized by camera images or another digital representation. The tasks include recalling spatiotemporal details of a 2D environment (such as the different shapes and colors of the "dancers" shown in FIG. 5(*a*)); recalling where an object is hidden in a 3D environment shown in FIG. 5(*b*); learning and retaining new object names shown in FIG. 5(*c*); choosing a color at the end of an episode that matches the color seen in the beginning of the episode shown in FIG. 5(*d*); chaining together transitive inferences over different stimuli pairings in order to respond to a probe FIG. 5(*e*); and navigating in a new neighborhood characterized by camera images shown in FIG. 5(*f*). As such, effectively controlling an agent to perform these tasks require capabilities of long-term recall, retention, or reasoning over memory.

It can be appreciated that, as shown in the table on the bottom of FIG. 5, the "HCAM" agent (corresponding to an agent controlled using the neural network system described in this specification) generally outperforms the "TrXL" agent (corresponding to an agent controlled using an existing neural network system—the "Transformer-XL" system described in Dai, Zihang, et al. "*Transformer-xl: Attentive language models beyond a fixed-length context*." arXiv preprint arXiv:1901.02860 (2019)—that uses a segment-level recurrence mechanism) and the "LSTM" agent (corresponding to an agent controlled using an existing neural network system that implements a recurrent LSTM network) by a substantial margin on a majority of the tasks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term “database” is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term “engine” is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user’s device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are correspond toed in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes correspond toed in the accompanying figures do not necessarily require the particular order shown, or sequential order, to achieve desirable results. In some cases, multitasking and parallel processing may be advantageous.

The invention claimed is:

1. A system for performing a machine learning task on a network input to generate a network output, the system comprising one or more computers and one or more storage devices storing instructions that, when executed by the one or more computers, cause the one or more computers to implement:

an attention neural network configured to perform the machine learning task, the attention neural network comprising one or more hierarchical attention blocks, each hierarchical attention block configured to:

receive an input sequence for the hierarchical attention block that has a respective block input at each of a plurality of input positions in an input sequence order;

maintain a plurality of memory summary keys, each memory summary key corresponding to a respective one of a plurality of partitions of a sequence of memory block inputs that has a respective memory block input at each of a plurality of memory positions in a memory sequence order, wherein each memory block input has previously been processed by the hierarchical attention block when performing the machine learning task;

determine, from the plurality of memory summary keys and a sequence of queries derived from the input sequence for the hierarchical attention block, a proper subset of the plurality of memory summary keys; and generate an attended input sequence for the hierarchical attention block including applying an attention mechanism over the respective memory block inputs at the memory positions within the partitions of the sequence of memory block inputs that correspond to the proper subset of the plurality of memory summary keys.

2. The system of claim 1, wherein the memory sequence order corresponds to a temporal order in which the memory block inputs were previously processed by the hierarchical attention block when performing the machine learning task.

3. The system of claim 1, wherein the hierarchical attention block is further configured to apply a normalization to the input sequence for the hierarchical attention block prior to determining the proper subset and generating the attended input sequence.

4. The system of claim 1, wherein determining the proper subset of the plurality of memory summary keys comprises:

determining a relevance score for each partition of the sequence of memory block inputs with respect to the sequence of queries, including, for each query in the sequence of queries, computing a dot product between the query and each of the plurality of memory summary keys; and selecting, based on the relevance scores, the proper subset of the plurality of memory summary keys from the plurality of memory summary keys that correspond to the respective partitions of the sequence of memory block inputs.

5. The system of claim 4, wherein, for each partition of the sequence of memory block inputs that corresponds to a respective memory summary key in the proper subset of the plurality of memory summary keys, the hierarchical attention block is configured to:

apply the attention mechanism between the input sequence and the respective memory block inputs at the memory positions within the partition to generate an initial attended input sequence.

6. The system of claim 5, wherein generating the attended input sequence for the hierarchical attention block comprises:

determining a weighted combination of the initial attended input sequences, wherein each initial attended input sequence is weighted by the relevance score for the corresponding partition.

7. The system of claim 1, wherein generating the attended input sequence for the hierarchical attention block further comprises:

determining a combination between the input sequence and the attended input sequence.

8. The system of claim 1, wherein maintaining the plurality of memory summary keys comprises:

partitioning the memory block inputs into the plurality of partitions that are of a fixed length.

9. The system of claim 1, wherein maintaining the plurality of memory summary keys comprises:

applying a mean pooling operation over one or more memory block inputs included in each partition to generate the memory summary key that corresponds to the partition.

10. The system of claim 1, wherein the hierarchical attention block is further configured to:

apply a feed-forward transformation to the attended input sequence to generate an output sequence for the hierarchical attention block.

11. The system of claim 1, wherein the input sequence for the hierarchical attention block comprise a sequence of attention layer outputs of an attention layer of the attention neural network that is configured to generate the sequence of attention layer outputs based on applying a self-attention mechanism over a sequence of attention layer inputs of the attention layer.

12. The system of claim 1, wherein the hierarchical attention block is configured to determine that a caching criterion is satisfied and in response add the input sequence to the sequence of memory block inputs and generating a new partition that includes the input sequence.

13. The system of claim 1, wherein the network input is a sequence of observations each characterizing a respective state of an environment interacted with by an agent and the network output is a policy output for controlling the agent to perform an action in response to a last observation in the sequence of observations.

14. One or more non-transitory computer-readable storage media storing instructions that when executed by one or more computers cause the one or more computers to implement an attention neural network configured to perform a machine learning task on a network input to generate a network output, the attention neural network comprising one or more hierarchical attention blocks, each hierarchical attention block configured to:

receive an input sequence for the hierarchical attention block that has a respective block input at each of a plurality of input positions in an input sequence order;

maintain a plurality of memory summary keys, each memory summary key corresponding to a respective one of a plurality of partitions of a sequence of memory block inputs that has a respective memory block input at each of a plurality of memory positions in a memory sequence order, wherein each memory block input has previously been processed by the hierarchical attention block when performing the machine learning task;

determine, from the plurality of memory summary keys and a sequence of queries derived from the input sequence for the hierarchical attention block, a proper subset of the plurality of memory summary keys; and generate an attended input sequence for the hierarchical attention block including applying an attention mechanism over the respective memory block inputs at the memory positions within the partitions of the sequence of memory block inputs that correspond to the proper subset of the plurality of memory summary keys.

15. A method comprising:

receiving a network input; and processing the network input using an attention neural network to generate a network output, wherein processing the network input comprises, at each of one or more hierarchical attention blocks of the attention neural network:

receiving an input sequence for the hierarchical attention block that has a respective block input at each of a plurality of input positions in an input sequence order;

maintaining a plurality of memory summary keys, each memory summary key corresponding to a respective one of a plurality of partitions of a sequence of memory block inputs that has a respective memory block input at each of a plurality of memory positions in a memory sequence order, wherein each memory block input has previously been processed by the hierarchical attention block when performing a machine learning task;

determining, from the plurality of memory summary keys and a sequence of queries derived from the input sequence for the hierarchical attention block, a proper subset of the plurality of memory summary keys; and generating an attended input sequence for the hierarchical attention block including applying an attention mechanism over the respective memory block inputs at the memory positions within the partitions of the sequence of memory block inputs that correspond to the proper subset of the plurality of memory summary keys.

16. The method of claim 15, further comprising training the attention neural network based on optimizing a self-supervised loss function that evaluates a difference between a training input and a reconstructed training input generated by using the attention neural network.

17. The method of claim 16, wherein the training input comprises image data or text data.

18. The method of claim 15, wherein the memory sequence order corresponds to a temporal order in which the memory block inputs were previously processed by the hierarchical attention block when performing the machine learning task.

19. The method of claim 15, wherein the hierarchical attention block is further configured to apply a normalization to the input sequence for the hierarchical attention block prior to determining the proper subset and generating the attended input sequence.

20. The method of claim 15, wherein determining the proper subset of the plurality of memory summary keys comprises:

determining a relevance score for each partition of the sequence of memory block inputs with respect to the sequence of queries, including, for each query in the sequence of queries, computing a dot product between the query and each of the plurality of memory summary keys; and selecting, based on the relevance scores, the proper subset of the plurality of memory summary keys from the plurality of memory summary keys that correspond to the respective partitions of the sequence of memory block inputs.

* * * * *